United States Patent [19]
Horst

[11] Patent Number: 4,942,345
[45] Date of Patent: Jul. 17, 1990

[54] POLE CHANGING SWITCHED RELUCTANCE MOTOR AND METHOD

[75] Inventor: Gary E. Horst, St. Louis County, Mo.

[73] Assignee: Emerson Electric Co., St. Louis, Mo.

[21] Appl. No.: 310,739

[22] Filed: Feb. 14, 1989

[51] Int. Cl.⁵ .......................................... H02K 37/00
[52] U.S. Cl. .................................... 318/254; 318/138
[58] Field of Search ................................. 318/254, 138

[56] References Cited

U.S. PATENT DOCUMENTS

| | | | |
|---|---|---|---|
| 3,866,104 | 2/1911 | Heine | 318/138 |
| 3,873,897 | 3/1975 | Muller | 318/138 |
| 4,309,643 | 1/1982 | Akamatsu | 318/254 |
| 4,540,921 | 9/1985 | Boyd, Jr. et al. | 318/254 |
| 4,636,936 | 1/1987 | Boyd, Jr. et al. | 318/254 |
| 4,642,537 | 2/1987 | Young | 318/254 |
| 4,670,696 | 6/1987 | Byrne et al. | 318/138 |
| 4,777,419 | 10/1988 | Obradovic | 318/254 |
| 4,780,652 | 10/1988 | Rilly | 318/254 |

*Primary Examiner*—Bernard Roskoski
*Attorney, Agent, or Firm*—Polster, Polster and Lucchesi

[57] ABSTRACT

A switched reluctance motor has its stator poles divided into at least three phases, each phase having its own independently switchable phase windings wound around the corresponding stator poles. First switch elements control application of power to the windings of the first phase, second switch elements control application of power to the windings of the second phase, and third switch elements control application of power to the windings of the thirds phase. For low speed operation of the motor, the switch elements for each phase are controlled to apply power to its respective phase windings from a selected turn-on angle to a selected turn-off angle. The maximum difference in low speed operation between the turn-on angle and the turn-off angle for each phase is no greater than the angle subtended by adjacent stator poles as measured from the geometric center of the stator. For high speed operation, only the windings of the first phase are energized, and the difference between the turn-on angle and the turn-off angle for the first phase windings is greater than the angle subtended by adjacent stator poles.

9 Claims, 2 Drawing Sheets

POLE CHANGING SWITCHED RELUCTANCE MOTOR AND METHOD

BACKGROUND OF THE INVENTION

This invention relates to switched reluctance motors, and more particularly to such motors designed for operation at various speeds.

Switched reluctance motors have attracted considerable attention over the past ten to fifteen years, primarily due to the simplicity of their construction and high power densities (ratio between output power and weight). These motors are doubly salient motors, having teeth on both the stator and the rotor, with phase windings only on the stator poles.

Except for very small (below 50 watt) motors, most switched reluctance motors are designed to operate below 2000 RPM because the core losses in switched reluctance motors are several times larger than in conventional machines of the same size. For that reason, conventional wisdom is that switched reluctance motors are best suited for low speed applications. Of course motors for certain applications (such as washer motors) are required to operate at much higher speeds.

Heretofore, switched reluctance motors operating over a wide speed range suffered from several disadvantages. The power factor of such motors was generally poor. These factors have heretofore made switched reluctance motors an undesirable choice for operation over a wide speed range.

SUMMARY OF THE INVENTION

Among the objects and features of the present invention may be noted the provision of a switched reluctance motor capable of high speed operation with acceptable core losses.

A second object of the present invention is the provision of such a motor with reduced current requirements during low speed operation.

A third object of the present invention is the provision of such a motor of reduced size.

A fourth object of the present invention is the provision of such a motor with improved speed range.

Other objects and features will be in part apparent and in part pointed out hereinafter.

Briefly, a switched reluctance motor of the present invention includes a stator having a plurality of salient stator poles disposed around a central bore and a rotor disposed for rotation in the central bore of the stator, the rotor also having a plurality of salient poles. The salient stator poles are divided into at least three phases, each phase having associated therewith separate, independently switchable phase windings wound around the stator poles of that phase. A first set of switch elements control application of power to the windings of the first phase, a second set of switch elements control application of power to the windings of the second phase, and a third set of switch elements control application of power to the windings of the third phase. Control circuitry governs the operation of the first, second and third sets of switch elements. The control circuitry during low speed operation governs each of the first, second and third sets of switch elements to apply power to the corresponding phase windings from a selected turn-on angle to a selected turn-off angle, the maximum difference during low speed operation between the turn-on angle and the turn-off angle for each phase being no greater than the angle subtended by adjacent stator poles as measured from the geometric center of the stator. The control circuitry during high speed operation governs the sets of switch elements so that only the phase windings of the first phase are energized, the difference between the turn-on angle and the turn-off angle for the first phase windings during high speed operation being greater than the angle subtended by adjacent stator poles.

A method of operating a switched reluctance motor of the present invention is directed to a motor having a plurality of stator poles divided into at least three phases, first switch elements for controlling the application of power to the windings of the first phase, second switch elements for controlling the application of power to the windings of the second phase, and third switch elements for controlling the application of power to the windings of the third phase. The method includes the steps of controlling the first switch elements for applying power to the windings of the first phase at a first, relatively high frequency for high speed operation of the motor and controlling the first, second and third switch elements for applying power to the windings of all three phases at a second, relatively low frequency for low speed operation of the motor. During low speed operation of the motor, the switch elements for each phase are controlled to apply power to its respective phase windings from a selected turn-on angle to a selected turn-off angle. The maximum difference in low speed operation between the turn-on angle and the turn-off angle for each phase is no greater than the angle subtended by adjacent stator poles as measured from the geometric center of the stator. During high speed operation, only the windings of the first phase are energized, the difference between the turn-on angle and the turn-off angle for the first phase windings during high speed operation being greater than the angle subtended by adjacent stator poles.

BRIEF DESCRIPTION OF THE DRAWINGS

Similar reference characters indicate similar parts throughout the several views of the drawings.

DESCRIPTION OF THE PREFERRED EMBODIMENT

Figure 1:
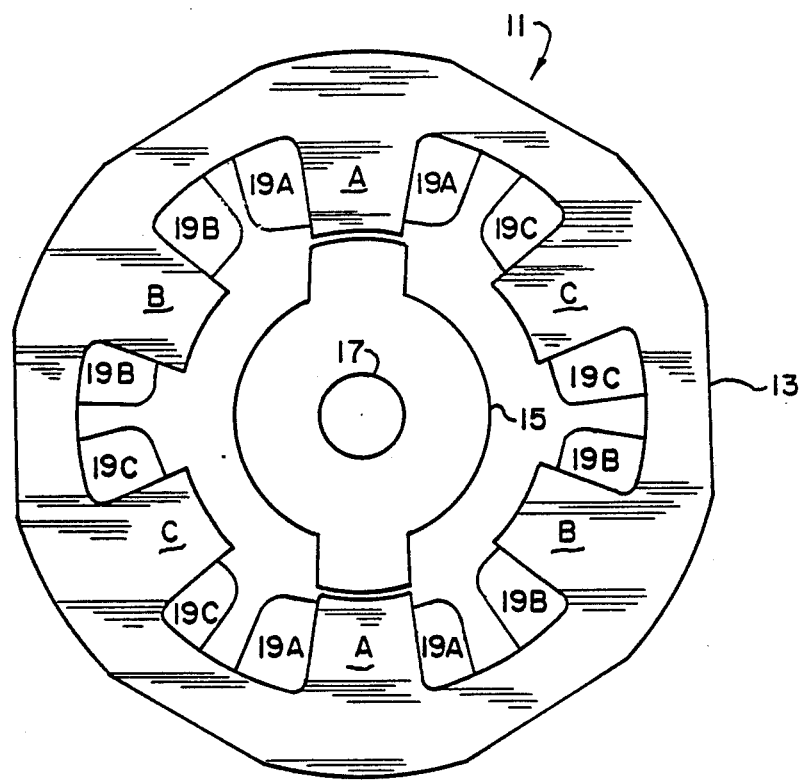
FIG. 1 is a schematic illustration of a switched reluctance motor of the present invention.

A motor 11 (FIG. 1) of the present invention includes a six-pole stator 13 whose six teeth extend radially inwardly from the stator yoke to define a central bore in which a two-pole rotor 15 is suitably mounted for rotation. The axis of rotation of rotor 15 is defined by a shaft 17.

The poles of stator 13 form three phases A, B, and C, each pole being associated with the pole diametrically opposed thereto to form one phase. Phase windings 19A, 19B, and 19C are wound around the respective teeth or poles of stator 13 to provide (when energized) the mmf for operation of the motor. The teeth of stator 13 are equally spaced about its perimeter. The teeth of rotor 15 are also equally spaced around its perimeter.

Motor 11 is designed to operate at two different speeds, e.g. at 627 rpm and 15,000 rpm. During low speed operation, the phase windings of all three phases are energized, whereas in high speed operation, only the windings of phase A are energized.

Figure 2:
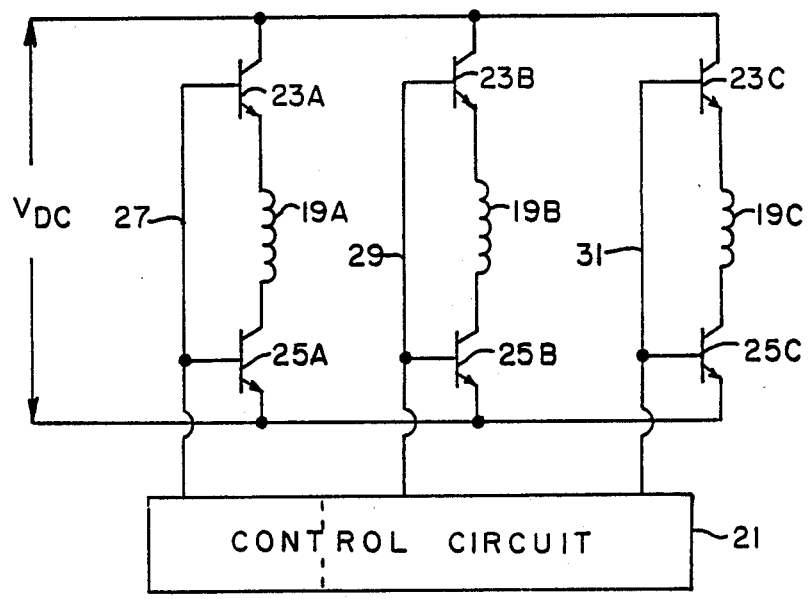
FIG. 2 is an electrical schematic of the drive and control circuitry of the motor of FIG. 1.

Turning to FIG. 2, direct current power is applied to the windings of motor 11 by means of six electronic switch elements (shown in FIG. 2 as transistors) under the control of a control circuit 21. Each phase winding has two switch elements 23 and 25 associated therewith, so that to energize a particular winding control circuit 21 must close both switch elements. When this occurs, current flows through the respective switch element 23, the associated winding 19 and the respective switch element 25 to complete a circuit across the dc supply.

It is well known that control circuit 21 by controlling the frequency at which control signals are supplied to switch elements 23 and 25 may control the speed of operation of motor 11. Such control circuits being common, it is not shown in detail herein. Control circuit 21 does, of course, differ from previously known control circuits in that it provides control signals at a relatively high frequency to the switch elements of phase A (for high speed operation) over a first control line 27 and control signals at a relatively low frequency to the switch elements of all three phases (for low speed operation) over first, second and third control lines 27, 29 and 31. This dual function of control circuit 21 is indicated by the dashed line across control circuit 21 in FIG. 2.

Figure 3:
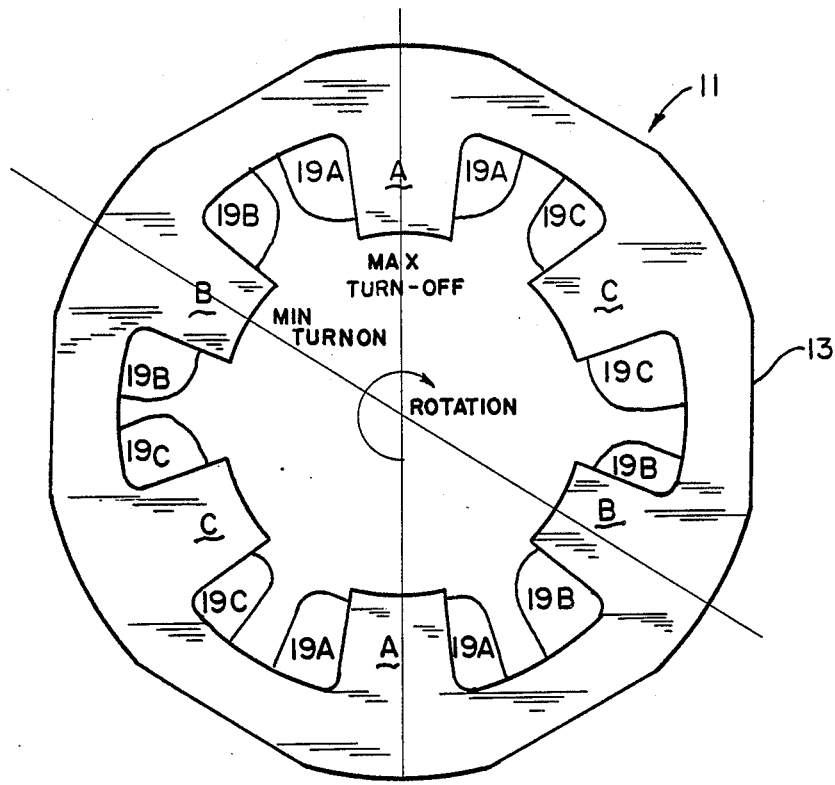
FIG. 3 is a schematic illustration of the motor of FIG. 1 with the rotor removed for clarity, illustrating turn-on and turn-off angles for low speed operation.

Control circuit 21 during low speed operation governing each of the first, second and third set of switch elements 23, 25 to apply power to the corresponding phase windings from a selected turn-on angle to a selected turn-off angle. This is illustrated in FIG. 3 where the minimum turn-on angle for the A-phase is centered on the poles for the previous phase, the B-phase. The maximum turn-off angle for the A-phase is, in turn, centered on the A-phase poles. The maximum difference during low speed operation between the turn-on angle and the turn-off angle for each phase is, accordingly, no greater than the angle subtended by adjacent stator poles as measured from the geometric center of the stator. For the low speed of 627 rpm, described above, the control signals are therefore applied to each phase at the relatively low frequency of 1254 cycles per minute.

Figure 4:
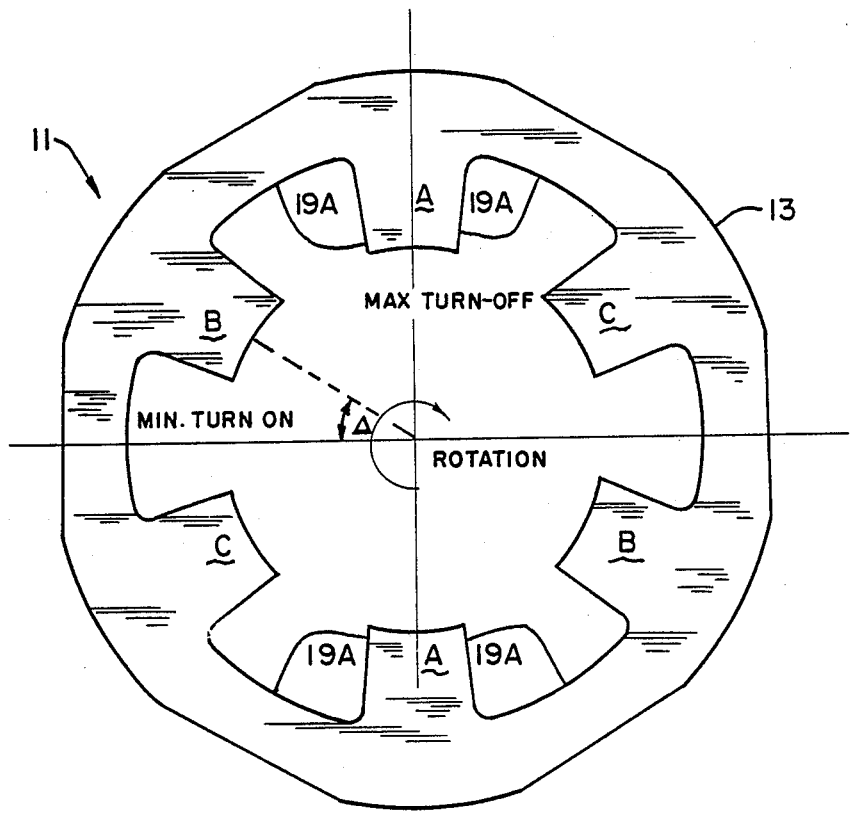
FIG. 4 is a schematic illustration similar to FIG. 3 illustrating turn-on and turn-off angles for high speed operation.

The situation during high speed operation is very different, as illustrated by FIG. 4. In this mode of operation, the control circuit governs the switch elements so that only the phase windings of the first phase are energized. (For this reason only the phase windings of the A-phase are shown in FIG. 4.). For the high speed of 15,000 rpm, described above, the control signals are therefore applied to the A-phase at the relatively high frequency of 30,000 cycles per minute. This permits the minimum turn-on angle to be changed as illustrated in FIG. 4 by the angle "delta." More specifically, this allows the advance angle to be advanced to a point where the inductance is low enough to permit the current to build up for torque production during high speed operation. If this angle were not advanced, the number of winding turns would have to be lowered on all three phases for high speed operation. This would result in higher currents at low speed/high torque conditions, thereby increasing the size of the motor. But by using only one phase and advancing the turn-on angle, the current can build sufficiently even though the number of turns is high. This configuration has the added advantage that it reduces iron losses at high speed.

The difference between the turn-on angle and the turn-off angle for the first phase windings during high speed operation is greater than the angle subtended by adjacent stator poles, which is vastly different from the situation during low speed operation. During low speed operation the maximum difference between the turn-on angle and the turn-off angle for any phase is approximately sixty degrees. But the difference between the turn-on angle and the turn-off angle for the first phase during high speed operation is approximately ninety degrees, an increase of fifty percent. Moreover, the efficiency of the motor during high speed operation is greater than fifty percent.

Although the present invention has been described in connection with a six-two switched reluctance motor, it should be realized that the invention is not limited to such a pole combination. It is equally applicable to other pole combinations and to multitoothed poles.

In view of the above, it will be seen that the various objects and features of the present invention are achieved and other advantageous results are obtained. As various changes could be made in the above constructions and methods without departing from the scope of the invention, it is intended that all matter contained in the above description and shown in the accompanying drawings shall be interpreted as illustrative and not in a limiting sense.

Having thus described the invention, what is claimed and desired to be secured by Letters Patent is:

1. A switched reluctance motor comprising:
   a stator having a plurality of salient stator poles disposed around a central bore;
   a rotor disposed for rotation in the central bore of the stator, said rotor having a plurality of salient poles;
   said plurality of salient stator poles being divided into at least three phases, each phase having associated therewith separate, independently switchable phase windings wound around the stator poles of that phase;
   first switch means for controlling application of power to the windings of the first phase;
   second switch means for controlling application of power to the windings of the second phase;
   third switch means for controlling application of power to the windings of the third phase; and
   control means for governing the operation of the first, second and third switch means;
   said control means during low speed operation governing each of the first, second and third switch means to apply power to the corresponding phase windings from a selected turn-on angle to a selected turn-off angle, the maximum difference during low speed operation between the turn-on angle and the turn-off angle for each phase being no greater than the angle subtended by adjacent stator poles as measured from the geometric center of the stator;
   said control means during high speed operation governing the switch means so that only the phase windings of the first phase are energized, the difference between the turn-on angle and the turn-off angle for the first phase windings during high speed operation being greater than the angle subtended by adjacent stator poles.

2. The switched reluctance motor as set forth in claim 1 wherein the maximum difference between the turn-on angle and the turn-off angle for any phase during low speed operation is approximately sixty degrees.

3. The switched reluctance motor as set forth in claim 2 wherein the difference between the turn-on angle and the turn-off angle for the first phase during high speed operation is approximately ninety degrees.

4. The switched reluctance motor as set forth in claim 1 wherein the difference between the turn-on angle and the turn-off angle for the first phase during high speed operation is approximately fifty percent greater than the maximum difference between the turn-on angle and the turn-off angle for the first phase during low speed operation.

5. The switched reluctance motor as set forth in claim 1 wherein the stator has six poles.

6. The switched reluctance motor as set forth in claim 1 wherein the speed range of the motor is at least twenty to one.

7. The switched reluctance motor as set forth in claim 1 wherein the efficiency of the motor during high speed operation is greater than fifty percent.

8. A method of operating a switched reluctance motor, said motor having a plurality of stator poles divided into at least three phases, said switched reluctance motor having first switch elements for controlling the application of power to the windings of the first phase, second switch elements for controlling the application of power to the windings of the second phase, and third switch elements for controlling the application of power to the windings of the third phase, the method comprising:

controlling the first switch elements for applying power to the windings of the first phase at a first, relatively high frequency for high speed operation of the motor; and controlling the first, second and third switch elements for applying power to the windings of all three phases at a second, relatively low frequency for low speed operation of the motor;

during low speed operation of the motor, the switch elements for each phase being controlled to apply power to its respective phase windings from a selected turn-on angle to a selected turn-off angle, the maximum difference in low speed operation between the turn-on angle and the turn-off angle for each phase being no greater than the angle subtended by adjacent stator poles as measured from the geometric center of the stator; and during high speed operation, energizing only the windings of the first phase, the difference between the turn-on angle and the turn-off angle for the first phase windings during high speed operation being greater than the angle subtended by adjacent stator poles.

9. The method as set forth in claim 8 wherein the turn-on angle for the windings of the first phase during high speed operation is increased approximately fifty percent over the turn-on angle of the first phase during low speed operation.

* * * * *